UNITED STATES PATENT OFFICE.

GEORGE B. BURNHAM, OF BOROSOLVAY, CALIFORNIA.

PROCESS OF OBTAINING POTASSIUM SODIUM SULFATE FROM SALINE LIQUORS.

1,321,282.   Specification of Letters Patent.   Patented Nov. 11, 1919.

No Drawing.   Application filed June 16, 1919. Serial No. 304,499.

*To all whom it may concern:*

Be it known that I, GEORGE B. BURNHAM, a citizen of the United States, residing at Borosolvay, in the county of San Bernardino and State of California, have invented a certain new and useful Process of Obtaining Potassium Sodium Sulfate from Saline Liquors, of which the following is a specification.

This invention relates to the process of obtaining potassium sodium sulfate from saline liquors containing potassium by means of adding sodium sulfate, or a solution of sodium sulfate.

An object of the invention is to provide a cheap process for obtaining potassium sodium sulfate from saline liquors and also to obtain the potassium sodium sulfate free from carbonates and borates where large quantities of the latter are present in the liquor.

The invention possesses other advantageous features, some of which, with the foregoing, will be set forth in the following description where I shall outline in full one form of the process of my invention. I shall describe the process as applied to mother liquor brines left over in the process of recovering potash from Searles Lake in California, but it is to be understood that the process is not limited to this particular brine.

These mother liquor brines are relatively high in sodium, potassium, chlorid, carbonate and borate, and low in sulfate.

Hitherto, treatment of these brines to obtain potassium chlorid produces a deposit of mixed salts, but with my process of producing potassium sodium sulfate a pure double salt of potassium is obtained free from other salts.

It is preferred to use a brine as high in potassium as possible. When a brine is encountered which is relatively much higher in sulfate than in potassium, or is saturated with sodium sulfate, it will be necessary to treat the brine to increase the proportion of potassium to the sulfate.

The ratio of the potassium and sulfate ions in the brine may vary greatly and still be able to produce potassium sodium sulfate. The theoretical limit of the amount of the sulfate ions in the brine must be such that the concentrated brine is not saturated with sodium sulfate. However, even if the concentrated brine is nearly but not quite saturated with sodium sulfate it can still be used to produce the double salt. A small amount of sodium sulfate is added and a small amount of potassium sodium sulfate is obtained. The yield is small because of working with the brine too close to the saturation point of sodium sulfate, and small yields are not desirable commercially. The farther the brine is away from this saturation point of sodium sulfate the more sodium sulfate can be added to the brine and the greater will be the yield of the double salt. For this reason, it is commercially more feasible to use brines much richer in potassium than in sulfate, for then the brine would be far from the saturation point of sodium sulfate.

In the preferred form of my process a solution of sodium sulfate in water is added to the mother liquor brine of Searles Lake, which is fairly rich in potassium, and is therefore far from the saturation point of sodium sulfate. Care is taken not to add too much sodium sulfate solution to cause the resulting liquor to become immediately saturated with sodium sulfate upon evaporation. The amount of sodium sulfate that should be added to obtain the best results will depend upon the composition of the brine.

This mixture of mother liquor brine and sodium sulfate solution is then allowed to evaporate and the double salt, potassium sodium sulfate, $(K,Na)SO_4$, is crystallized out. Evaporation is continued until another salt begins to crystallize out. At this point the remaining liquor is removed, and the potassium sodium sulfate is gathered, dried or filtered, and is then ready for the market as a fertilizer.

Sometimes evaporation may continue a little beyond the point where other salts begin to crystallize, if these other salts crystallize out in such small proportion that they do not materially impair the value of the potassium sodium sulfate being deposited.

In some cases it may be desirable to add solid sodium sulfate directly to the mother liquor brine instead of adding a solution of sodium sulfate in water and evaporating. In such cases a chemical reaction takes place whereby the sodium sulfate goes into solution and potassium sodium sulfate crystallizes out of the solution at the same time. The evaporation step is thus eliminated by this method, but it usually requires the addition of finely ground sodium sulfate and considerable agitation in order to make the chemical reaction complete.

I claim:

1. The process of obtaining potassium sodium sulfate from concentrated liquors not saturated with sodium sulfate, but containing sufficient potassium ions to more than saturate the liquor with potassium sodium sulfate upon the addition of sodium sulfate, which consists in adding sodium sulfate whereby potassium sodium sulfate is crystallized out.

2. The process of obtaining potassium sodium sulfate from liquors containing potassium ions and not saturated with sodium sulfate, which consists in adding a solution of sodium sulfate and evaporating the liquor to crystallize out potassium sodium sulfate.

3. The process of obtaining potassium sodium sulfate from liquors containing potassium, and other ions, which consists in adding a solution of sodium sulfate, evaporating the liquor to crystallize out potassium sodium sulfate, continuing the evaporation to saturation with other salts, removing the liquor from the deposited crystals, and recovering the potassium sodium sulfate.

GEORGE B. BURNHAM.